(12) United States Patent
Akamine et al.

(10) Patent No.: US 11,983,937 B2
(45) Date of Patent: May 14, 2024

(54) INTERSECTING ROAD ESTIMATION DEVICE

(71) Applicant: DENSO CORPORATION, Kariya (JP)

(72) Inventors: Yusuke Akamine, Nisshin (JP); Katsuhiko Kondo, Nisshin (JP); Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 654 days.

(21) Appl. No.: 17/144,874

(22) Filed: Jan. 8, 2021

(65) Prior Publication Data

US 2021/0133465 A1    May 6, 2021

Related U.S. Application Data

(63) Continuation of application No. PCT/JP2019/026499, filed on Jul. 3, 2019.

(30) Foreign Application Priority Data

Jul. 12, 2018 (JP) ................. 2018-132373

(51) Int. Cl.
*G06V 20/56* (2022.01)
(52) U.S. Cl.
CPC ............... *G06V 20/588* (2022.01)
(58) Field of Classification Search
CPC ...... G06V 20/588; G06V 20/56; G01S 13/93; G01S 13/931; G08G 1/16
See application file for complete search history.

(56) References Cited

U.S. PATENT DOCUMENTS

| | | | |
|---|---|---|---|
| 2007/0010937 A1 | 1/2007 | Sakuma | |
| 2018/0061236 A1* | 3/2018 | Yamamoto | ....... G08G 1/096725 |
| 2020/0184233 A1* | 6/2020 | Berberian | ............ G06V 20/588 |

FOREIGN PATENT DOCUMENTS

| | | |
|---|---|---|
| JP | 2005-010892 A | 1/2005 |
| JP | 2007-230267 A | 9/2007 |
| JP | 2012-103970 A | 5/2012 |
| JP | 2012-118867 A | 6/2012 |
| JP | 2012-242937 A | 11/2012 |
| JP | 2012-233713 A | 12/2012 |
| JP | 2013-036978 A | 2/2013 |
| JP | 2014-115904 A | 6/2014 |
| JP | 2015-001773 A | 1/2015 |
| JP | 2017-211256 A | 11/2017 |

* cited by examiner

*Primary Examiner* — Jianxun Yang
(74) *Attorney, Agent, or Firm* — MASCHOFF BRENNAN

(57) ABSTRACT

An intersecting road estimation device includes an object detection unit that detects an object existing around an own vehicle and a position of the object, an object extraction unit that extracts a stationary object and a position of the stationary object from an object detection result, a first estimation unit that estimates a road edge of a traveling road on which the own vehicle is traveling based on the position of the stationary object, a candidate extraction unit that extracts a stationary object existing outside the road edge of the traveling road estimated by the first estimation unit as a candidate for an outside stationary object representing a road edge of an intersecting road intersecting the traveling road, and a second estimation unit that estimates the road edge of the intersecting road based on a position of the outside stationary object extracted by the candidate extraction unit.

12 Claims, 6 Drawing Sheets

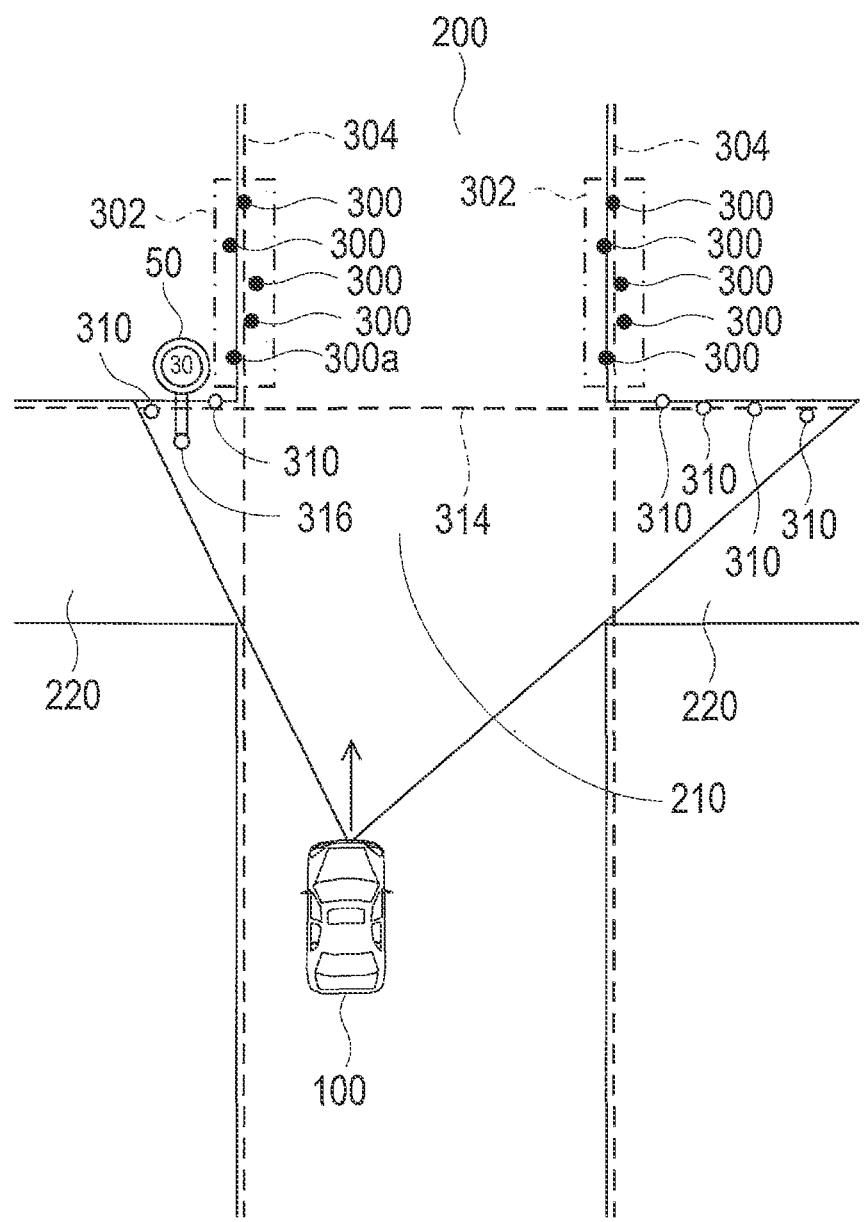

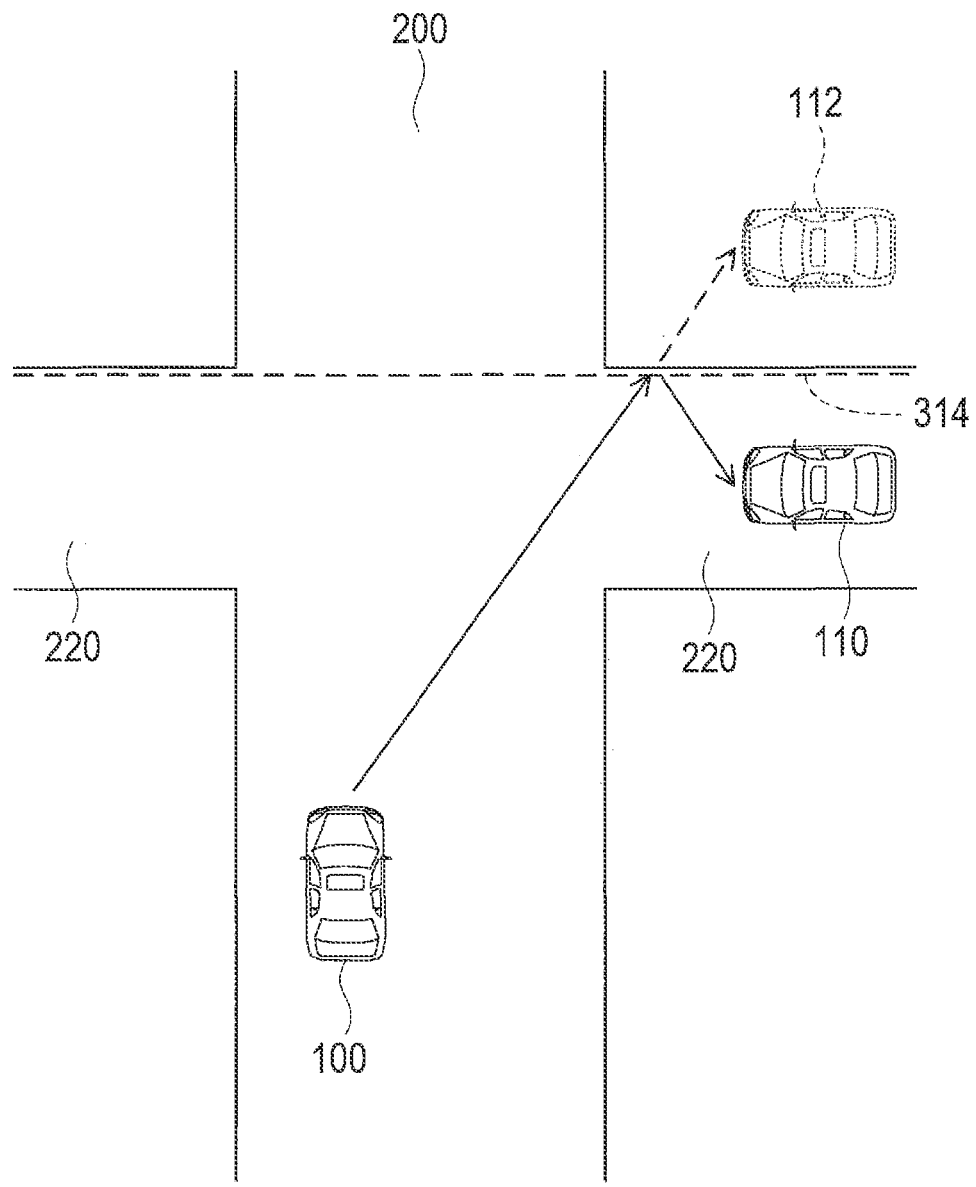

INTERSECTING ROAD ESTIMATION DEVICE

CROSS-REFERENCE TO RELATED APPLICATION

The present application is based on Japanese Patent Application No. 2018-132373 filed on Jul. 12, 2018, the description of which is incorporated herein by reference.

BACKGROUND

Technical Field

The present disclosure relates to a technique for estimating (supposing) a road edge of an intersecting road that intersects with a road on which an own vehicle is traveling (hereinafter also referred to as "traveling road").

Related Art

A technique described detects, among objects ahead of an own vehicle, roadside structures forming the shape of a traveling road using a laser radar or the like, and calculates the distance from a road edge in the width direction of the traveling road to the own vehicle based on the position of the roadside structure that is closest to the vehicle and the radius of curvature of the road.

SUMMARY

As an aspect of the present disclosure, an intersecting road estimation device that is vehicle-mounted is provided. The intersecting road estimation device includes: an object detection unit configured to detect an object existing around an own vehicle and a position of the object; an object extraction unit configured to extract a stationary object and a position of the stationary object from an object detection result provided by the object detection unit; a first estimation unit configured to estimate a road edge of a traveling road on which the own vehicle is traveling based on the position of the stationary object extracted by the object extraction unit; a candidate extraction unit configured to extract a stationary object existing outside the road edge of the traveling road estimated by the first estimation unit as a candidate for an outside stationary object representing a road edge of an intersecting road intersecting the traveling road; and a second estimation unit configured to estimate the road edge of the intersecting road based on a position of the outside stationary object extracted by the candidate extraction unit.

BRIEF DESCRIPTION OF THE DRAWINGS

In the accompanying drawings:

FIG. 5 is a schematic diagram illustrating misrecognition of a road edge of an intersecting road; and FIG. 6 is a schematic diagram illustrating estimation of a moving object traveling on an intersecting road.

DETAILED DESCRIPTION OF THE PREFERRED EMBODIMENTS

The technique described in JP 4100269 B detects, among objects ahead of an own vehicle, roadside structures forming the shape of a traveling road using a laser radar or the like, and calculates the distance from a road edge in the width direction of the traveling road to the own vehicle based on the position of the roadside structure that is closest to the vehicle and the radius of curvature of the road.

In addition to the road on which the own vehicle is traveling, it may be desirable to estimate (suppose) a road edge of an intersecting road that intersects the traveling road and use it to estimate a moving object that is moving towards the vehicle on the intersecting road in the same direction as that of the road edge. However, when stationary objects such as roadside structures existing in front of the vehicle are to be detected by a laser radar or the like as in the technique described in JP 4100269 B, the detected stationary objects would include both stationary objects at the road edges in the width direction of the traveling road, and stationary objects at the road edges in the width direction of the intersecting road intersecting that road.

The inventors made a detailed study, and found out a problem that the technique disclosed in JP 4100269 B does not consider estimating a road edge of an intersecting road intersecting the traveling road from the detection results in which the stationary objects at the road edges of the traveling road and the stationary objects at the road edges of the intersecting road are mixed.

An embodiment of the present disclosure will be described with reference to the drawings.

[1. Configuration]

Figure 1:
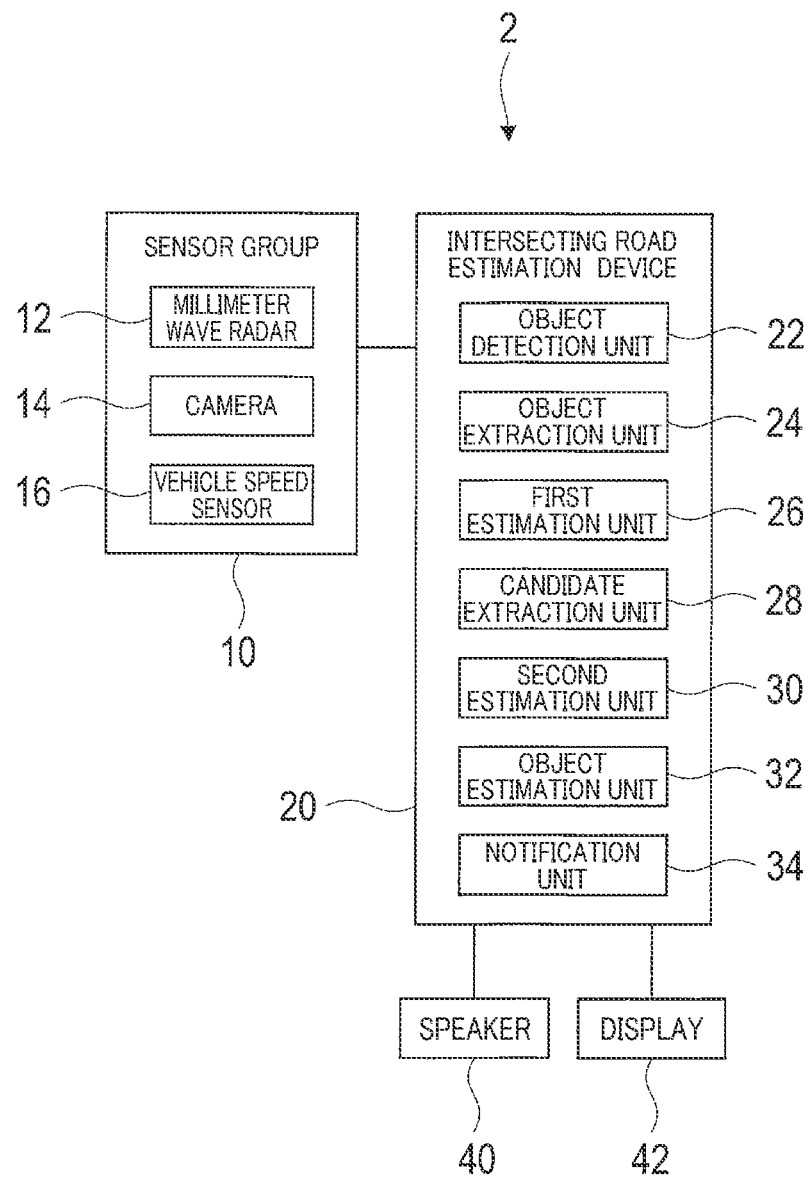
FIG. 1 is a block diagram showing an intersecting road estimation device of the present embodiment.

A vehicle-mounted intersecting road estimation (supposition) system 2 shown in FIG. 1 includes a sensor group 10, an intersecting road estimation device 20, a speaker 40, and a display 42. The sensor group 10 includes a millimeter-wave radar 12, a camera 14, and a vehicle speed sensor 16.

The millimeter wave radar 12 emits a search wave that is frequency-modulated with a triangular wave from an antenna, receives a reflected wave reflected from an object existing around an own vehicle by the antenna, and outputs a beat signal after performing mixing.

Since the waveform of a beat signal changes in response to an interference generated according to the distance to the object and a relative speed of the object with respect to the own vehicle, it is possible to calculate the distance between the own vehicle and the object and the relative speed of the object with respect to the own vehicle from the waveform of the beat signal. Further, since a reflected wave is received if an object exists in the direction in which the search wave is emitted, the direction of the object existing around the own vehicle with respect to the own vehicle can be detected. The relative position of the object with respect to the own vehicle can be detected based on the distance between the own vehicle and the object and the direction of the object with respect to the own vehicle.

The camera 14 captures an image of an area in front of the vehicle and outputs image data. The distance between the own vehicle and the object and the relative position of the object with respect to the own vehicle may be detected based on the object's position, distance from the own vehicle, and direction with respect to the own vehicle represented by the image data captured by the camera 14. The vehicle speed sensor 16 detects a vehicle speed based on a rotation speed of the wheels of the own vehicle.

The main component of the intersecting road estimation device 20 is a well-known microcomputer including a CPU, a semiconductor memory such as RAM, ROM, or flash memory, and an output/input interface. Hereinafter, the semiconductor memory may also be simply referred to as a memory. Various functions of the intersecting road estimation device 20 are implemented by the CPU executing a program(s) stored in a non-transitory tangible recording medium.

In this example, the memory corresponds to the non-transitory tangible recording medium for storing the program. Further, a method corresponding to the program is performed by execution of the program. The intersecting road estimation device 20 may include one or more microcomputers.

The intersecting road estimation device 20 includes, as a configuration of functions implemented by the CPU executing the program, an object detection unit 22, an object extraction unit 24, a first estimation unit 26, a candidate extraction unit 28, a second estimation unit 30, an object estimation unit 32, and a notification unit 34.

The means for implementing these elements constituting the intersecting road estimation device 20 is not limited to software, and a part or all of the elements may be implemented by using one or more hardware components. For example, when the above functions are implemented by an electronic circuit which is hardware, the electronic circuit may be implemented by a digital circuit including many logic circuits or an analog circuit, or a combination thereof.

[2. Processing]

Figure 2:
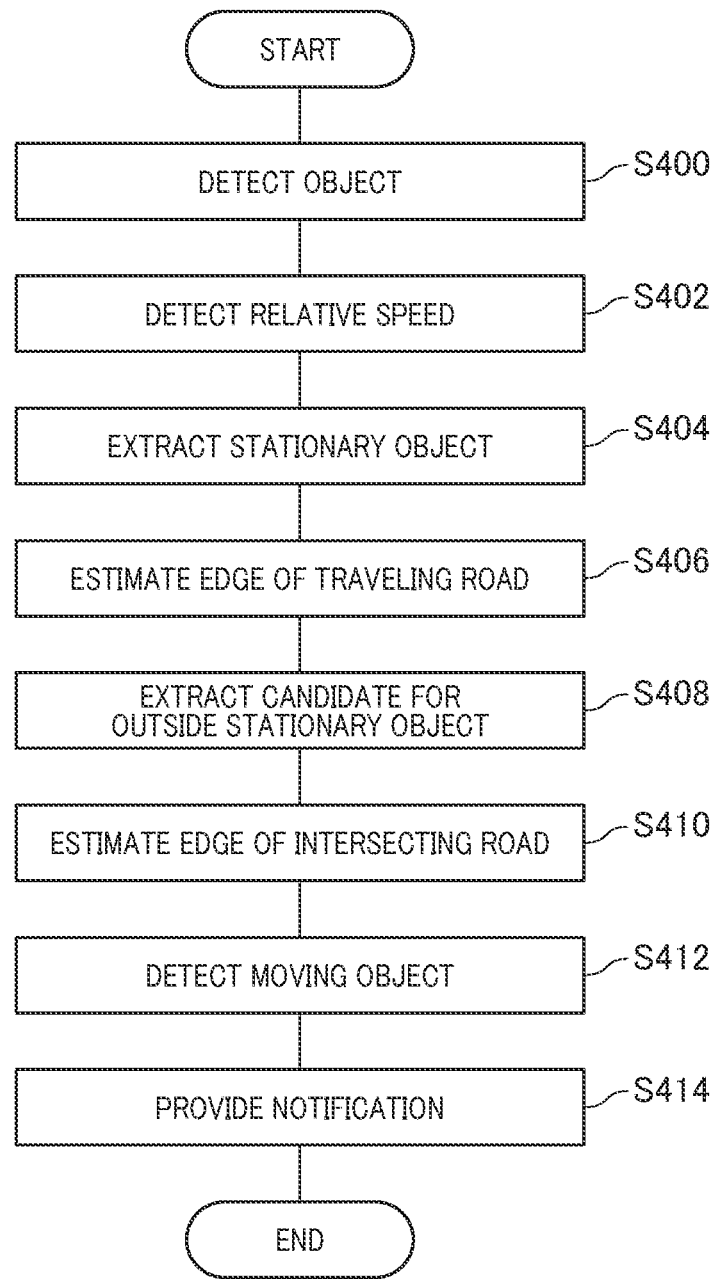
FIG. 2 is a flowchart showing a process of estimating a road edge of an intersecting road.

A road edge estimation process of an intersecting road 220 executed by the intersecting road estimation device 20 will be described with reference to the flowchart shown in FIG. 2.

In S400, the object detection unit 22 detects an object existing around the own vehicle, a distance between the own vehicle and the object, and a direction of the object with respect to the own vehicle based on a detection signal of the millimeter wave radar 12 or image data captured by the camera 14. Further, the object detection unit 22 detects a relative position of the object with respect to the own vehicle from the distance between the own vehicle and the object and the direction of the object with respect to the own vehicle.

In S402, the object detection unit 22 detects a relative speed of the object with respect to the own vehicle based on a beat signal output by the millimeter wave radar 12. The object detection unit 22 may also detect a moving speed of the object from a positional change of the object per unit time, based on image data captured by the camera 14, and detect a relative speed of the object with respect to the own vehicle based on the detected moving speed and a vehicle speed of the own vehicle.

In S404, the object extraction unit 24 extracts stationary object(s) out of objects existing around the own vehicle detected by the object detection unit 22, based on a vehicle speed of the own vehicle acquired from the vehicle speed sensor 16 and a relative speed of the object with respect to the own vehicle detected by the object detection unit 22. Further, the object extraction unit 24 extracts a relative position of the stationary object with respect to the own vehicle from the detection results of the object detection unit 22. The object extraction unit 24 may extract an object whose position does not change as a stationary object out of the objects existing around the own vehicle detected by the object detection unit 22.

Figure 3:
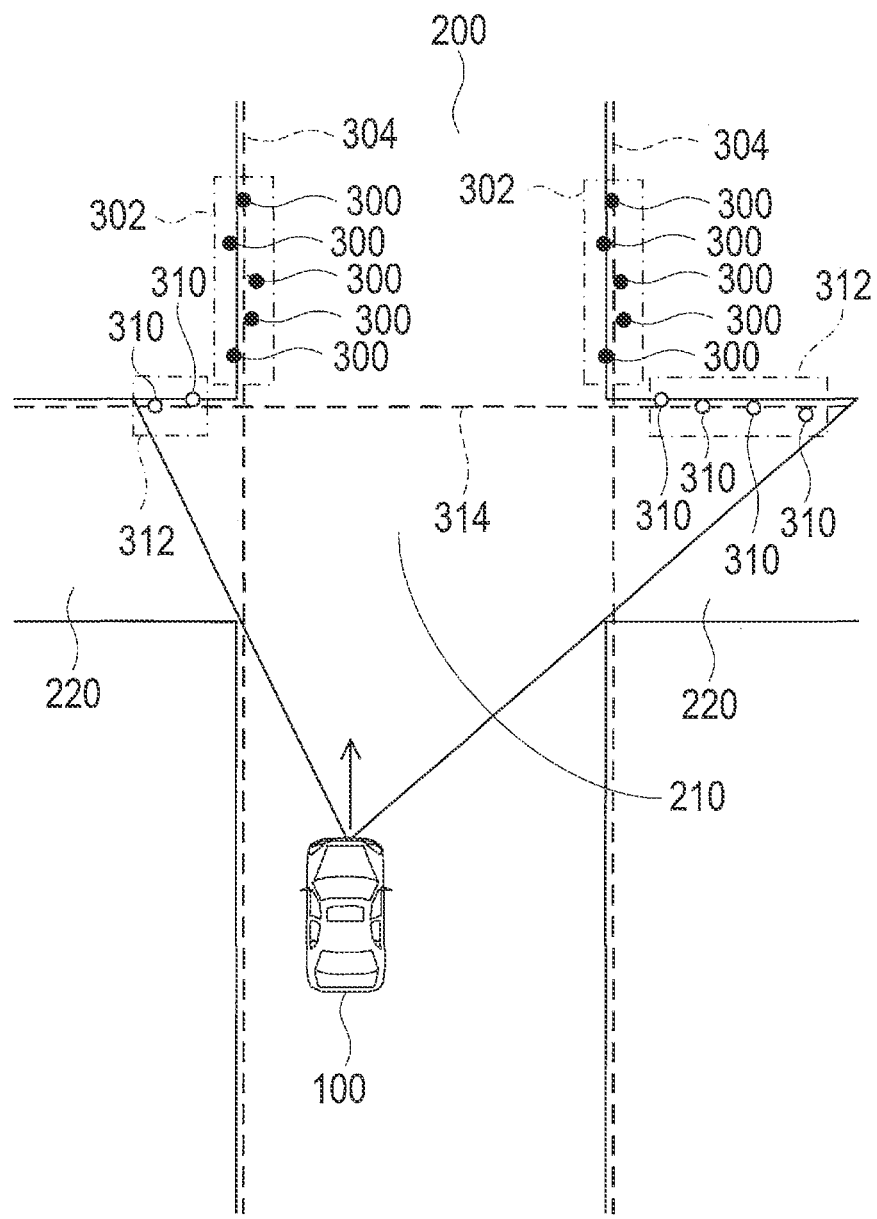
FIG. 3 is a schematic diagram showing road edges of a traveling road and road edges of an intersecting road.

In S406, as shown in FIG. 3, the first estimation unit 26 groups a plurality of stationary objects 300 existing along a traveling road 200 on which the own vehicle 100 is traveling and extracted by the object extraction unit 24, and forms a stationary object group 302.

The stationary object group 302 is composed of such stationary objects 300 that, on each side of the traveling road 200, the distance between each other in the width direction of the traveling road 200 is within a predetermined range that is considered to represent a continuous road edge along the traveling direction. Therefore, stationary objects 300 existing on opposite sides of the traveling road 200 in the width direction form different stationary object groups 302.

For example, the stationary objects 300 are each a detected point corresponding to a single object detected by the millimeter wave radar 12, or each a detected point corresponding to a part of a continuous object such as a wall or a guardrail detected by the millimeter wave radar 12. The stationary objects detected as detected points are not limited to walls and guardrails, but may also be curbs, buildings, or the like.

The first estimation unit 26 sets an approximate straight line that approximates positions of the stationary objects 300 constituting the stationary object group 302. For example, the first estimation unit 26 sets the approximate straight line such that the sum of the squares of distances between the approximate straight line and the stationary objects 300 is minimized. Then, the first estimation unit 26 estimates (supposes) the approximate straight lines set from the left and right stationary object groups 302 of the traveling road 200 as road edges 304 of the traveling road 200.

Note that, when the own vehicle 100 is traveling without stopping, it is desirable that the first estimation unit 26 detects stationary objects 300 existing on each side of the traveling road 200 in the width direction, and estimates the road edges 304 of the traveling road 200 based on the positions of the stationary objects 300. This is because when the own vehicle 100 is traveling, different stationary objects 300 can be speed-separated according to their relative speed with respect to the own vehicle 100, which allows the detection accuracy of the stationary objects 300 to be improved.

Further, since the vehicle width of the traveling road 200 does not change suddenly, the road edges 304 of the traveling road 200 ahead of the own vehicle 100 in the traveling direction can be considered to lie on the extensions of the road edges 304 of the traveling road 200 estimated until that point.

Figure 4:
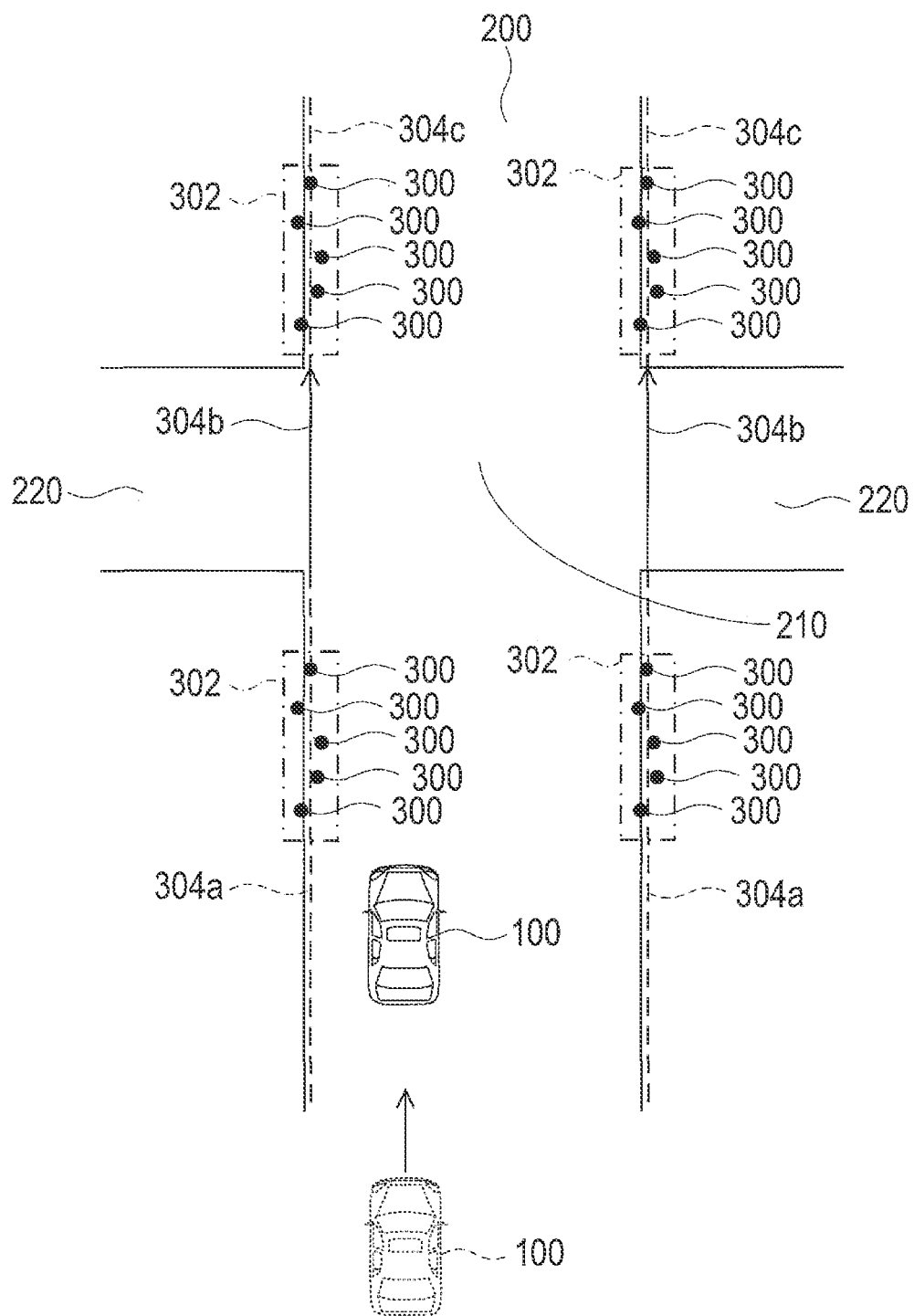
FIG. 4 is a schematic diagram illustrating detection of the road edges of the traveling road.

Therefore, as shown in FIG. 4, as the own vehicle 100 moves forward, the first estimation unit 26 may extend the road edges 304*a* of the traveling road 200 on the side of the own vehicle 100 with respect to the intersection 210 estimated so far, as indicated by arrows 304*b*, and use them as candidates for the road edges of the traveling road 200 that are beyond the intersection 210 in the traveling direction of the own vehicle 100.

Then, the first estimation unit 26 may obtain the average positions of road edges 304*c* of the traveling road 200 estimated based on the stationary object groups 302 that are beyond the intersection 210 in the traveling direction of the own vehicle 100 and the arrows 304*b* extended from the road edges 304*a* estimated so far, and use the obtained average positions as the road edges 304 of the traveling road 200 extending beyond the intersection 210 in the traveling direction of the own vehicle 100.

In S408, as shown in FIGS. 3 and 5, the candidate extraction unit 28 extracts, as candidates for the outside stationary objects 310 representing the road edge 314 of the intersecting road 220 intersecting with the traveling road 200, stationary objects existing outside the road edges 304 of the traveling road 200 extracted by the object extraction unit 24.

However, as shown in FIG. 5, even when a stationary object 316 exists outside the road edge 304 of the traveling road 200, when the stationary object 316 is closer to the own vehicle 100 by a predetermined distance or more than the stationary object 300a that is the starting point of the stationary object group 302 on the own vehicle 100 side, the candidate extraction unit 28 excludes the stationary object 316 from the candidates for the outside stationary objects 310 representing the road edge of the intersecting road 220.

The position of the stationary object 316 excluded from the outer stationary object 310 is, for example, the position of a point of contact between a road sign 50 and the road, as shown in FIG. 5.

The above-mentioned predetermined distance used to determine whether the stationary object 316 should be excluded from the candidates for the outside stationary objects 310 representing the road edge of the intersecting road 220 is such a distance that it can be judged that the stationary object 316 is located such that the stationary object 316 is too far from the stationary object 300a, which is the starting point of the stationary object group 302 on the own vehicle 100 side, toward the own vehicle 100 side when the stationary object 316 is used as the candidate for the outside stationary objects 310 representing the road edge 314 of the intersecting road 220.

In S410, the second estimation unit 30 sets an approximate straight line that approximates the positions of the outside stationary objects 310 constituting a stationary object group 312 similarly to the first estimation unit 26. The second estimation unit 30 estimates the approximate straight line set on the further side of the intersecting road 220 as seen in the traveling direction of the own vehicle 100 as the road edge 314 of the intersecting road 220.

Further, the second estimation unit 30 estimates the position and direction of the road edge 314 of the intersecting road 220 to be estimated in the current processing cycle based on the position and direction of the road edge 314 of the intersecting road 220 estimated based on the outside stationary objects 310 in the current processing cycle, and the position and direction of the road edge 314 of the intersecting road 220 stored in the memory in each processing cycle performed up to that point. Then, the second estimation unit 30 stores the determined position and direction of the road edge 314 of the intersecting road 220 in the memory.

In S412, the object estimation unit 32 extracts the positions and moving directions of moving objects moving on the traveling road 200 and the intersecting road 220 from the detection result of the object detection unit 22. Then, the object estimation unit 32 estimates the position and moving direction of a moving object 110 moving on the intersecting road 220 based on the positions and moving directions of the moving objects and the position and direction of the road edge 314 of the intersecting road 220. The object estimation unit 32 estimates the moving direction of the moving object 110 moving on the intersecting road 220 as the direction along the road edge 314 of the intersecting road 220.

As shown in FIG. 6, when the position of the moving object 112 is behind the road edge 314 of the intersecting road 220 estimated by the second estimation unit 30 with respect to the own vehicle 100, the object estimation unit 32 determines that the object detection unit 22 has erroneously detected the actual position of the moving object 110 because a search wave of the millimeter wave radar 12 was reflected by a structure or the like representing the road edge 314 of the intersecting road 220.

In this case, the object estimation unit 32 folds back the position of the erroneously detected moving object 112 to the opposite side using the road edge 314 as the axis of symmetry to correct the position of the moving object 110 to the actual position.

In S414, when it is determined that the moving object 110 moving on the intersecting road 220 is approaching the own vehicle based on the position and direction of the moving object 110 moving on the intersecting road 220 estimated by the object estimation unit 32, the notification unit 34 uses a speaker 40 or a display 42 to notify the occupants of the own vehicle 100 that the moving object is approaching the own vehicle.

[3. Effects]

According to the present embodiment described above, the following effects can be obtained.

(1) The outside stationary objects 310 existing outside the road edges 304 of the traveling road 200 on which the own vehicle 100 is traveling are extracted as candidates for the road edge 314 of the intersecting road 220. This makes it possible to distinguish the stationary objects representing the road edges 304 of the traveling road 200 from the stationary objects representing the road edge 314 of the intersecting road 220 from the detection results in which the stationary objects representing the road edges 304 of the traveling road 200 and the stationary objects representing the road edge 314 of the intersecting road 220 are mixed. Therefore, the road edge 314 of the intersecting road 220 can be estimated based on the positions of the extracted outside stationary objects 310.

(2) As the own vehicle 100 moves forward, the road edges of 304 of the traveling road 200 that are beyond the intersection 210 in the traveling direction of the own vehicle 100 are estimated based on the estimation results of the road edges 304 of the traveling road 200 on the side of the own vehicle 100 with respect to the intersection 210 estimated up to that point.

This makes it possible to estimate the road edges 304 of the traveling road 200 that are beyond the intersection 210 in the traveling direction of the own vehicle 100 with high accuracy based on the estimation results of the road edges 304 of the traveling road 200 on the side of the own vehicle 100 with respect to the intersection 210 estimated up to that point.

(3) When the stationary object 316 is closer to the own vehicle 100 side by a predetermined distance or more than the stationary object 300a representing the starting point of the stationary object group 302 used to estimate the road edges 304, the stationary object 316 is excluded from the candidates for the outside stationary objects 310 representing the road edge 314 of the intersecting road 220. This makes it possible to prevent the road sign 50 or the like from being erroneously extracted as the outside stationary object 310 representing the road edge 314 of the intersecting road 220.

(4) The position and direction of the road edge 314 of the intersecting road 220 to be estimated in the current processing cycle are determined based on the position and direction of the road edge 314 of the intersecting road 220 estimated in the current processing cycle, and the position and direction of the road edge 314 of the intersecting road 220 stored in the memory in each processing cycle performed up to that point.

This makes it possible to estimate the position and direction of the road edge 314 of the intersecting road 220 with high accuracy based on the positions and directions of the road edge 314 of the intersecting road 220 estimated in multiple processing cycles, instead of those estimated in the current single processing cycle.

(5) When a moving object 112 existing outside the road edge 314 of the intersecting road 220 is detected based on the reflected wave of a search wave emitted from the millimeter wave radar 12, it is judged that the actual position of the moving object 110 was erroneously detected because the search wave of the millimeter wave radar 12 was reflected by a structure or the like representing the road edge 314. In this case, the position of the moving object 110 can be corrected to its correct position by folding back the erroneously detected position of the moving object 112 to the opposite side with reference to the road edge 314 serving as the axis of symmetry.

By correcting the erroneously detected position of the moving object 112 to the correct position of the moving object 110 in such a manner based on the reflected wave of the search wave, it is possible to estimate the presence of the moving object 110 that is moving on the intersecting road 220 at a location that cannot be visually recognized from the own vehicle 100 or cannot be captured by the camera 14.

In the above-described embodiment, the speaker 40 and the display 42 correspond to a notification device.

Further, S400 and S402 correspond to processing performed by an object detection unit, S404 corresponds to processing performed by an object extraction unit, S406 corresponds to processing performed by a first estimation unit, S408 corresponds to processing performed by a candidate extraction unit, S410 corresponds to processing performed by a second estimation unit, S412 corresponds to processing performed by an object estimation unit, and 414 corresponds to processing performed by a notification unit.

4. Other Embodiments

An embodiment for implementing the present disclosure has been described above, but the present disclosure is not limited to the above-described embodiment and can be implemented with various modifications.

(1) Instead of the millimeter wave radar 12 or the camera 14 used to detect objects around the own vehicle 100 in the above embodiment, objects around the own vehicle 100 may be detected based on, for example, LiDAR detection signals. LiDAR is an abbreviation for Light Detection and Ranging.

(2) When the traveling road 200 and the intersecting road 220 are orthogonal to each other as in the above embodiment, outside stationary objects of the intersecting road 220 on the own vehicle 100 side cannot be detected, and therefore the road edge of the intersecting road 220 on the own vehicle 100 side cannot be estimated. In contrast, when the intersecting road intersects the traveling road diagonally with respect to the own vehicle, it may be possible to detect outside stationary objects on each side of the intersecting road in the width direction. In this case, the road edges of the intersecting road may be estimated based on the outside stationary objects existing on each side of the intersecting road in the width direction.

(3) A plurality of functions of a single component of the above embodiment may be implemented by a plurality of components, or a single function of a single component may be implemented by a plurality of components. Further, a plurality of functions of a plurality of components may be implemented by a single component, or a single function implemented by a plurality of components may be realized by a single component. Furthermore, a part of the configuration of the above embodiment may be omitted. Furthermore, at least a part of the configuration of the above embodiment may be added or a substituted in the configuration of the other embodiments described above. Note that all of the modes included in the technical spirit specified from the wording of the claims are embodiments of the present disclosure.

(4) Besides the above-described intersecting road estimation device 20, the present disclosure may be implemented in various forms such as an intersecting road estimation system including the intersecting road estimation device 20, a program for causing a computer to function as the intersecting road estimation device 20, a non-transitory tangible recording medium such as a semiconductor memory storing the program, and an intersecting road estimation method.

One aspect of the present disclosure is preferably to provide a technique for estimating (supposing) a road edge of an intersecting road that intersects a road on which an own vehicle is traveling.

A vehicle-mounted intersecting road estimation (supposition) device (20) according to an aspect of the present disclosure includes an object detection unit (22, S400), an object extraction unit (24, S404), a first estimation (supposition) unit (26, S406), a candidate extraction unit (28, S408), and a second estimation (supposition) unit (30, S410).

The object detection unit detects an object (110, 300, 310, 316) existing around an own vehicle (100) and a position of the object. The object extraction unit extracts a stationary object (300, 310, 316) and a position of the stationary object from an object detection result provided by the object detection unit. The first estimation unit estimates (supposes) a road edge (304) of a traveling road (200) on which the own vehicle is traveling based on the position of the stationary object extracted by the object extraction unit.

The candidate extraction unit extracts a stationary object (310) existing outside the road edge of the traveling road estimated by the first estimation unit as a candidate for an outside stationary object representing a road edge (314) of an intersecting road (220) intersecting the traveling road. The second estimation unit estimates (supposes) the road edge of the intersecting road based on a position of the outside stationary object extracted by the candidate extraction unit.

According to such a configuration, even when the stationary objects to be extracted by the object extraction unit include both the stationary objects representing the road edges of the traveling road and the stationary objects representing the road edges of the intersecting road, it is possible to extract stationary objects located outside the road edges of the traveling road as candidates for outside stationary objects representing the road edges of the intersecting road. This makes it possible to estimate (suppose) the road edges of the intersecting road based on the positions of the outside stationary objects.

What is claimed is:

1. An intersecting road estimation device that is vehicle-mounted, comprising:
   an object detection unit configured to detect an object existing around an own vehicle and a position of the object;
   an object extraction unit configured to extract a plurality of stationary objects and a position of each of the stationary objects from an object detection result provided by the object detection unit;

a first estimation unit configured to:
  extract, from the stationary objects extracted by the object extraction unit, at least one pair of first and second stationary objects, the first and second stationary objects of the at least one pair being respectively located on both sides of a traveling road on which the own vehicle is traveling, a distance between the first and second stationary objects of the at least one pair being within a predetermined range; and
  estimate a pair of road edges of the traveling road based on the position of each of the first and second stationary objects of the at least one pair;
a candidate extraction unit configured to extract, from the stationary objects extracted by the object extraction unit, plural stationary objects as candidates for outside stationary objects using the estimated pair of road edges of the traveling road, each of the plural stationary objects existing outside the pair of road edges of the traveling road, the outside stationary objects representing a road edge of an intersecting road intersecting the traveling road; and
a second estimation unit configured to perform an estimation cycle of estimation of the road edge of the intersecting road based on a position of the outside stationary objects extracted by the candidate extraction unit.

2. The intersecting road estimation device according to claim 1, wherein
the second estimation unit is configured to estimate the road edge of the intersecting road by approximating, with a straight line, positions of at least two points of the outside stationary objects.

3. The intersecting road estimation device according to claim 1, wherein
the first estimation unit is configured to estimate the pair of road edges of the traveling road that is beyond an intersection in a traveling direction of the own vehicle based on a previous estimation result of the pair of road edges of the traveling road obtained previously by the first estimation unit.

4. The intersecting road estimation device according to claim 1, wherein
the second estimation unit is configured to:
  repeatedly perform the estimation cycle to accordingly store a position and direction of the road edge of the intersection road for each estimation cycle; and
  determine, for each estimation cycle, the position and direction of the road edge of the intersection road estimated by the corresponding estimation cycle based on the position and direction of the road edge stored in at least one estimation cycle performed previous to the corresponding estimation cycle.

5. The intersecting road estimation device according to claim 1, wherein
the first estimation unit is configured to generate, as the at least one pair of first and second stationary objects, plural pair of first and second stationary objects, the distance between the first and second stationary objects of each of the plural pairs being within the predetermined range,
  the first stationary objects included in the plural pairs constituting a first group, the second stationary objects included in the plural pairs constituting a second group; and
  the candidate extraction unit is configured to exclude, from the candidates for the outside stationary objects, at least one candidate that is separated towards a side of the own vehicle by a predetermined distance or more from a position of a start-point stationary object included in one of the first group and the second group, the start-point stationary object included in one of the first group and the second group being located closest to the own vehicle.

6. The intersecting road estimation device according to claim 1, wherein
the object detection unit is configured to detect a relative speed of the object with respect to the own vehicle, and
the object extraction unit is configured to detect the plurality of stationary objects based on the relative speed of the object detected by the object detection unit and a vehicle speed of the own vehicle.

7. The intersecting road estimation device according to claim 1, wherein
the object extraction unit is configured to detect the plurality of stationary objects based on a change in the position of the object.

8. The intersecting road estimation device according to claim 1, wherein
the first estimation unit is configured to estimate the pair of road edges of the traveling road when the own vehicle is traveling.

9. The intersecting road estimation device according to claim 1, further comprising
an object estimation unit configured to extract a moving object and a position of the moving object from the object detection result provided by the object detection unit and estimate a position and moving direction of the moving object moving on the intersecting road based on the position of the moving object and a position and direction of the road edge of the intersecting road.

10. The intersecting road estimation device according to claim 9, wherein
the object estimation unit is configured to estimate the moving direction of the moving object as a direction along the road edge of the intersecting road.

11. The intersecting road estimation device according to claim 9, wherein
the object detection unit is configured to detect the position of the object by using a search wave and a reflected wave from the object, and
when the position of the moving object is on a further side of the road edge of the intersecting road with respect to the own vehicle, the object estimation unit corrects the position of the object such that the moving object on the further side of the road edge of the intersecting road with respect to the own vehicle is at a position reflected about the road edge of the intersecting road serving as an axis of symmetry.

12. The intersecting road estimation device according to claim 9, further comprising
a notification unit configured to notify an occupant of the own vehicle that the moving object is approaching by using a notification device when it is determined that the moving object is approaching the own vehicle based on the position and moving direction of the moving object estimated by the object estimation unit.

* * * * *